United States Patent Office 3,416,240
Patented Dec. 17, 1968

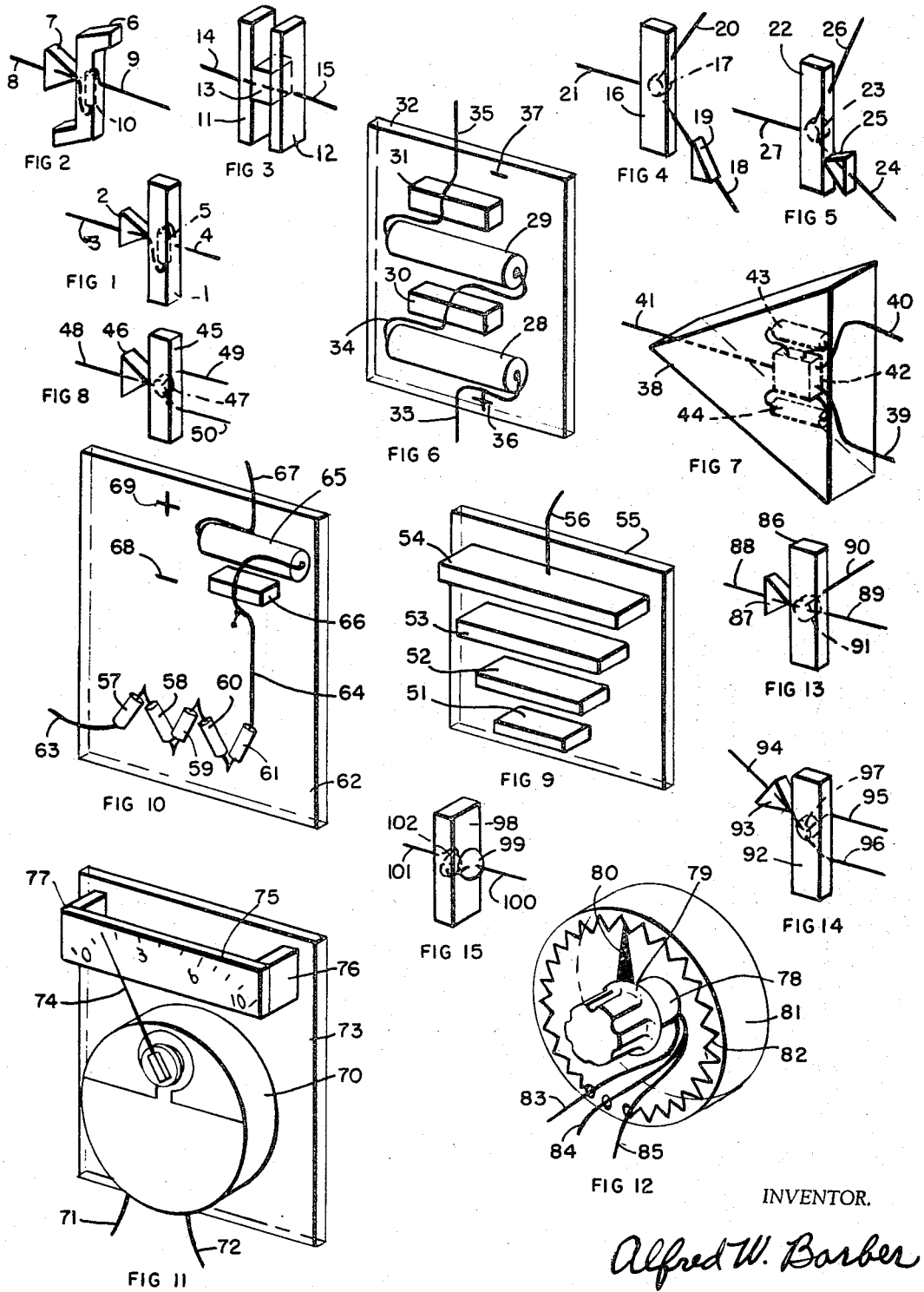

3,416,240
ELECTRONIC SYMBOLS COMBINING FUNCTIONAL CAPABILITIES WITH SYMBOLIC GRAPHIC REPRESENTATION
Alfred W. Barber, 32—44 Francis Lewis Blvd., Flushing, N.Y. 11358
Filed Jan. 11, 1967, Ser. No. 616,741
11 Claims. (Cl. 35—19)

ABSTRACT OF THE DISCLOSURE

The present invention comprises a plurality of electronic and associated devices which look like three dimensional graphical symbols, cast a shadow in the form of these symbols and at the same time are operational devices. The object is to provide a teaching system to bridge the gap between functional devices and their graphical representations. A schematic circuit diagram can be drawn and when duplicated with my devices in accordance with the present invention provides a working circuit which looks like the schematic. This method of setting up circuits makes learning easier, faster and more fun. The association of the device and its function with its graphical symbol becomes very easy. This association is often difficult to teach since hitherto there has been no physical way to relate symbols with functions.

Cross reference to related applications

No related applications have been filed showing any part of the present invention.

Background of the invention (1) *Field of the invention.*—The invention relates to teaching aids for teaching electrical and electronic circuit symbolic representation and actual circuit operation. The purpose is to meaningfully relate in a student's mind the meaning of graphical symbols. These symbols are particularly adapted for use with shadow-graph projectors and the like.

(2) *Description of the prior art.*—I am not aware of anything which may be considered as prior art.

Summary

The invention comprises a plurality of three dimensional devices which combine the physical appearance of graphical symbols with actual operating capabilities. For example, a transistor is constructed which looks like a three dimensional transistor symbol and includes concealed within it an actual transistor so that when this "symbol" is connected in a circuit it actually functions as the transistor it represents. Another example, is a three dimensional amplifier symbol containing concealed inside an actual amplifier and batteries for its operation so that it can be connected in a circuit and will not only look like an amplifier symbol but will also function as an amplifier. Other similar symbolic/functioning devices include rectifiers, Zener diodes, batteries, capacitors, resistors, potentiometers, grounds, meters and the like. The symbols just named comprise the major components used in setting up a wide variety of operational amplifier circuits. These functioning symbols may be assembled into various functioning circuits which look like the corresponding schematic diagrams. These functioning symbol/circuits may also be projected on a large screen as by means of an overhead projector or the like.

The object of the present invention is to provide a teaching aid which is extremely powerful in teaching the identity of electrical and electronic symbols with the functioning of these symbols in an actual circuit. In other words the object is to provide means for teaching what a transistor, for example, does in a circuit together with how it is shown symbolically. A further object is to provide three dimensional functioning circuit symbols which appear as three dimensional symbols and can also be presented as these same symbols by shadow-graph projection.

Brief description of the drawing

FIGURE 1 is a perspective view of a diode or rectifier functional three dimensional symbol in accordance with the present invention.

FIGURE 2 is a perspective view of a Zener diode functional three dimensional symbol in accordance with the present invention.

FIGURE 3 is a perspective view of a capacitor functional three dimensional symbol in accordance with the present invention.

FIGURE 4 is a perspective view of an NPN transistor functional three dimensional symbol in accordance with the present invention.

FIGURE 5 is a perspective view of a PNP transistor functional three dimensional symbol in accordance with the present invention.

FIGURE 6 is a perspective view of a battery functional three dimensional symbol in accordance with the present invention.

FIGURE 7 is a perspective view of an amplifier functional three dimensional symbol in accordance with the present invention.

FIGURE 8 is a perspective view of a field effect transistor functional three dimensional symbol in accordance with the present invention.

FIGURE 9 is a perspective view of a ground functional three dimensional symbol in accordance with the present invention.

FIGURE 10 is a perspective view of a resistor and battery functional three dimensional symbol in accordance with the present invention.

FIGURE 11 is a perspective view of a meter functional three dimensional symbol in accordance with the present invention.

FIGURE 12 is a perspective view of a potentiometer functional three dimensional symbol in accordance with the present invention.

FIGURE 13 is a perspective view of a silicon controlled rectifier three dimensional symbol in accordance with the present invention.

FIGURE 14 is a perspective view of a unijunction transistor functional three dimensional symbol in accordance with the present invention.

FIGURE 15 is a perspective view of a tunnel diode functional three dimensional symbol in accordance with the present invention.

Embodiments

FIGURE 1 is a perspective view of a rectifier or diode which is both a three dimensional symbol of a rectifier or diode and contains a concealed rectifier or diode so that it not only looks like a rectifier or diode symbol but also functions as a rectifier or diode. The bar 1 and arrow 2 may be formed in any convenient manner of insulating material as by machining, molding or casting. Inside the bar 1 is a concealed diode 5 connected to the external leads 3 and 4 with the anode of diode 5 going to lead 3 and cathode going to lead 4. I have found a convenient dimension for bar 1 to be 1 inch by ¼ inch by ¼ inch. These dimensions if carried out in proportion for the other devices in accordance with my present invention, will serve to show how my invention may be carried out in practice although I do not intend these stated dimensions to be taken as in any way a limitation.

FIGURE 2 is similar to FIGURE 1 except here the three dimensional functional symbol is a Zener diode including the bar section 6, arrow 7 and leads 8 and 9 connected to an actual Zener diode 10 concealed within the three dimensional structure. The very similar symbol for a dual or temperature compensated Zener having two arrows can be provided in the same manner with a three dimensional symbol and a concealed and functional Zener diode of the type represented by the symbol. It will be seen that this Zener diode three dimensional symbol in common with the other three dimensional symbols of the present invention are designed and constructed so that they also cast a shadow which is the schematic symbol. When illuminated from one side with parallel rays of light as in an overhead projector.

FIGURE 3 is a capacitor in which either one or both bars 11 and 12 are actual fixed capacitors or are in part fixed capacitor series or parallel connected to leads 14 and 15. The two bars 11 and 12 are held in parallel relationship as shown by a small piece of transparent material 13 which casts little or no shadow when illuminated from one side as in shadow-graph projection.

FIGURE 4 is an NPN transistor including the three dimensional bar portion 16 in which is embedded a real functional transistor 17 with emitter connected to lead 18 carrying arrow 19, collector connected to lead 20 and base connected to lead 21.

FIGURE 5 is a PNP transistor including the three dimensional bar portion 22 in which is embedded functional transistor 23 with emitter connected to lead 24 carrying arrow 25, collector connected to lead 26 and base connected to lead 27. It will be understood that these symbols may be varied to conform with other representations than those shown. The ones which have been chosen for purposes of illustration are some of the better standardized and more widely used symbols. The present invention embraces the concept of three dimensional functional symbols generally although only a few specific symbols have been shown in the drawing.

FIGURE 6 is a battery in which the two functional cells 28 and 29 are mounted in parallel relationship with blocks 30 and 31 provided to complete the battery symbol as by cementing to a transparent plastic base 32. The circuit is provided and completed by wires 33, 34 and 35. The polarity symbols of opaque material 36 and 37 may also be provided.

FIGURE 7 is an amplifier three dimensional functional symbol casting a shadow which is also the amplifier symbol consisting of three dimensional triangular body 38 from which project input leads 39 and 40 and output lead 41. Concealed within the triangular body 38 is an actual operational amplifier 42 and bias batteries 43 and 44 so that the device is functional as an amplifier requiring only connections to input leads 39 and 40 and output lead 41.

FIGURE 8 is a field effect transistor including bar 45, arrow 46, concealed field effect transistor 47 with gate connected to lead 48, source lead 49 and drain lead 50.

FIGURE 9 is a three dimensional and functional ground symbol made up of bars 51, 52, 53 and 54 cemented or otherwise mounted on transparent support 55 and provided with conductive lead 56.

FIGURE 10 is a three dimensional and functional fixed resistor made up of zig-zag series connected resistors 57, 58, 59, 60 and 61 cemented to transparent support 62. It will be seen that these resistors so mounted are in the form of the symbol for a fixed resistor and are at the same time a functional fixed resistor. The connecting leads for the resistor are leads 63 and 64. On this same transparent mounting other three dimensional functional symbols may be mounted and combined such as a battery made up of an actual functional battery 65 forming a part of the battery symbol which is completed by opaque block 66. The positive lead 67 is provided for the battery and the negative side of the battery is joined to the resistor by lead 64. The polarity signs 68 and 69 may also be provided made of opaque material or opaque ink or paint on base 62.

FIGURE 11 is a meter in three dimensional functional form constructed of a basic meter movement 70 with connecting leads 71 and 72 and mounted on a transparent base 73. The meter needle 74 in operation passes over a scale 75 formed of opaque markings on a transparent base. The meter scale is secured to base 73 by means of transparent supports 76 and 77.

FIGURE 12 is a potentiometer in three dimensional functional form consisting of a small functional potentiometer 78 provided with a knob 79 and an added pointer 80 and mounted on a transparent support 81 carrying an opaque resistor symbolic representation 82. The leads 83, 84 and 85 are both symbolic and functional being visually connected to resistor 82 and functionally connected to potentiometer 78.

FIGURE 13 is a silicon controlled rectifier three dimensional functional symbol including bar portion 86, arrow portion 87, anode lead 88, cathode lead 89 and gate lead 90 with silicon controlled rectifier 91 concealed in the opaque bar 86 and functionally connected to the external leads 88, 89 and 90.

FIGURE 14 is a unijunction transistor three dimensional functional symbol comprising bar portion 92, arrow portion 93, emitter lead 94, first base lead 96 and second base lead 95 with an actual functional unijunction transistor 97 concealed in the bar portion and functionally connected to leads 94, 95 and 96 respectively.

FIGURE 15 is a tunnel diode three dimensional functional symbol including bar portion 98, bell portion 99, leads 100 and 101 and concealed actual functional tunnel diode 102.

An alternate construction of the devices, particularly the transistor types is to cast the bar portions in clear plastic so that the actual operating device can be seen and to provide one surface of the device with an opaque surface or cover so that it will cast a shadow of the symbol as it would were it entirely opaque.

The three dimensional functional symbols shown and described above are illustrative of many symbols both electrical and electronic which can be provided in the manner described. The present invention embraces all such symbols to the extent set forth in particular in the appended claims.

I claim:

1. A set of three dimensional graphical symbols each of whose cross-sections is representative of an active electrical circuit component, each of said symbols comprising more than one representational part, at least one of said parts including the actual electrical component which corresponds to the symbol, and means for connecting said symbols together to form an electrical circuit.

2. A set of three dimensional graphical symbols as set forth in claim 1 wherein at least one of said circuit components is a fixed resistor.

3. A set of three dimensional graphical symbols as set forth in claim 1 wherein at least one of said circuit components is a dry cell battery.

4. A set of three dimensional graphical symbols as set forth in claim 1 wherein at least one of said circuit components is a transistor.

5. A set of three dimensional graphical symbols as set forth in claim 1 wherein at least one of said circuit components is a diode rectifier.

6. A set of three dimensional graphical symbols as set forth in claim 1 wherein at least one of said circuit components is a Zener diode.

7. A set of three dimensional graphical symbols as set forth in claim 1 wherein at least one of said circuit components is an operational amplifier.

8. A set of three dimensional graphical symbols as set forth in claim 1 wherein at least one of said circuit components is a potentiometer.

9. A set of three dimensional graphical symbols as set forth in claim 1 wherein at least one of said circuit components is a capacitor.

10. A set of three dimensional graphical symbols as set forth in claim 1 wherein at least one of said circuit components is a silicon controlled rectifier.

11. A set of three dimensional graphical symbols as set forth in claim 1 wherein at least one of said circuit components is an indicating meter including a calibrated scale.

References Cited

UNITED STATES PATENTS

| 2,592,552 | 4/1952 | De Florez | 35—19 |
| 3,062,991 | 11/1962 | Kaidan | 35—19 X |
| 3,078,596 | 2/1963 | Sweeton | 35—19 |

EUGENE R. CAPOZIO, *Primary Examiner.*

H. S. SKOGQUIST, *Assistant Examiner.*

U.S. Cl. X.R.

D26—1